Aug. 7, 1934.    V. WANEE    1,968,919
TANK GAUGE
Filed Aug. 4, 1930
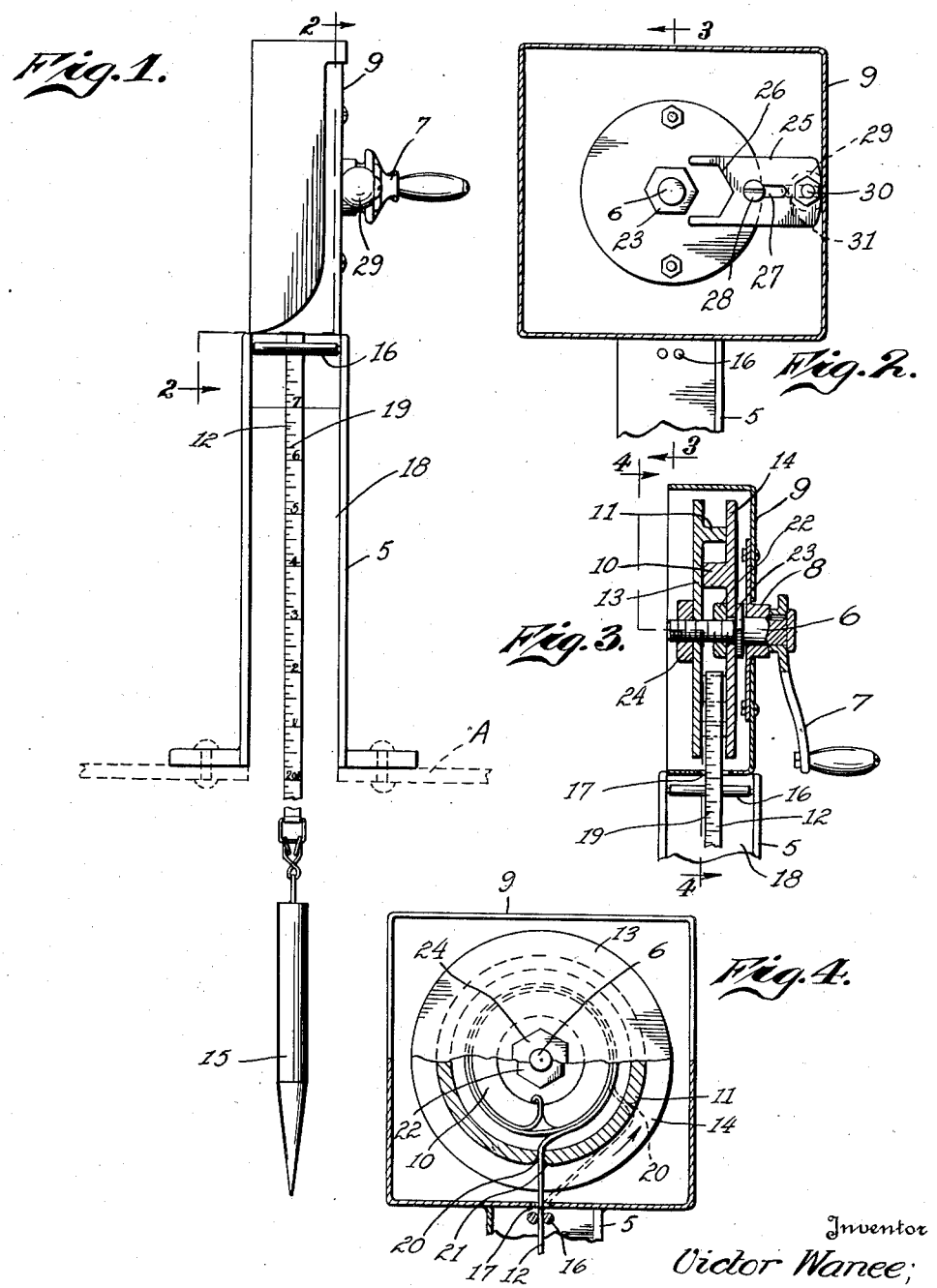

Patented Aug. 7, 1934                                                                    1,968,919

UNITED STATES PATENT OFFICE 1,968,919

TANK GAUGE

Victor Wanee, Gardena, Calif.

Application August 4, 1930, Serial No. 473,067

4 Claims. (Cl. 33—126)

This invention relates to gauges of the type installed on tanks for conveniently measuring the depth of the contents of the tanks.

An object of the invention is to save time in gauging the contents of tanks.

Another object is to obviate mistakes in gauging that might arise from failure of the gauger to lower the gauging tape to the bottom of the tank, or lowering the tape so that a portion of it lies on the bottom of the tank.

Another object is to make it possible to pre-adjust the gauge tape to any depth within the tank, whether it be to the bottom of the tank or to some higher level.

Another object is to facilitate reading and cleaning of the tape.

Another object is to minimize the breaking of tapes and preventing loss thereof.

Another object is to eliminate the necessity of carrying a gauge from tank to tank.

Another object is to make more agreeable the gauger's work in gauging tanks.

Another object is to make the gauging of tanks a clean operation.

Other objects and advantages will appear in the subjoined detailed description.

The accompanying drawing illustrates the invention:

Figure 1 is an elevation of a tank gauge constructed in accordance with the provisions of this invention.

Fig. 2 is a vertical view, partly in section, on the line indicated by 2—2, Fig. 1.

Fig. 3 is a vertical section of the tank gauge, a portion of the support being broken away and the plane of section being indicated by the line 3—3, Fig. 2.

Fig. 4 is a fragmental elevation from the left of Fig. 1, a portion being in section on a plane indicated by the line 4—4, Fig. 3.

Referring to the drawing, a housing or support 5 is adapted to be installed on the roof or top of a tank, which is fragmentarily indicated in dotted lines in Fig. 1 at A. The support 5 is provided with a shaft 6 turned by a crank 7 which may be mounted on an angular neck on the shaft. The shaft 6 rotates in a bearing 8 provided in a case 9 that constitutes the upper portion of the support 5.

Mounted on the shaft 6 and rotated by said shaft are inner and outer drums 10, 11 which are thus concentric. Fixed to the inner drum 10 and wound thereon is a measuring tape 12 which may be an ordinary steel tape of a type that is well-known in the art relating to surveying. The tape 12 is held against lateral displacement from the drum 10 by a flange 13 of the drum 11.

A flange 14 of the drum 10 extends past the drum 11 so as to prevent lateral displacement of whatever portion of the tape 12 may be wound on the drum 11, as will be made clear hereinafter. The free end of the tape 12 carries a weight or plumb-bob 15.

The tape 12 preferably passes between rollers 16 that are rotatably mounted in the support 5 immediately below the case 9, which case is provided in its bottom portion with an opening 17 through which the tape passes. The housing is provided in one side with an opening 18 through which the graduations on the tape may be seen and read by the gauger. The graduations on the tape are indicated at 19.

The tape passes from the inner drum through a slot 20 in the outer drum, as clearly shown in Fig. 4, the outer edge portions of the wall of the slot 20 preferably being rounded as indicated at 21.

The inner and outer drums are capable of independent adjustment on the shaft 6, that is to say, the inner drum is secured to the shaft 6 by a nut 22, threaded on the shaft 6 and a shoulder 23 on said shaft, and the outer drum is secured by a nut 24 also threaded to the shaft 6. The nut 22 bears against the inner face of the drum flange 14 and the shoulder 23 bears against the outer face of said flange 14. The nut 24 bears against the outer face of the flange 13.

As a preliminary to using the invention described above, the nut 24 will be loosened to permit circumferential adjustment of the outer drum with respect to the inner drum, and the shaft 6 will then be turned in a direction to unreel the tape from the inner drum to a sufficient extent to permit of the weight 15 just touching the bottom of the tank A, or any other desired level, when the slot 20 is approximately in its lowermost position, which position would naturally occur because the drum 11 is at this time loose on the shaft 6 and the pull of the tape 12 will naturally be vertical. If there be any bottom sediment in the tank, the tape 19 may be allowed to unreel until the lower end of the weight 15 strikes the bottom sediment.

After the weight 15 has reached the desired level, whether it be the actual bottom of the tank, the upper surface of the bottom sediment, or some other level, the shaft 6 will be held against turning and the nut 24 will be tightened, thus clamping the outer drum 11 against the drum 10. One such adjustment of the length of the tape will suffice at the time the gauge is installed on the tank, though subsequent adjustments may be made if it be desired to allow for bottom sediment.

It will now be seen that if the shaft 6 be turned in either direction, the tape will no longer be paid-out but will be reeled-in or wound upon the outer drum 11. The crank, then, will be operated in either direction to wind-up the tape, which will be left in this condition until it is desired to gauge the tank.

A suitable means is provided to lock the shaft 6 against rotation as, otherwise, the weight of the tape 12 and the weight 15 would cause the drum 11 to turn, thus unwinding the tape. This locking means, in this instance, is mounted in the case 9 and comprises a slide 25 provided with a jaw 26 which is adapted, when the slide 25 is moved to its innermost position, to embrace the shoulder 23, which has angularly disposed edges, thus to prevent rotation of said shoulder and, consequently, rotation of the shaft and drums. The slide 25 is provided with a longitudinally extending slot 27 through which passes a screw 28 secured to the case 9. The slide 25 is provided with a knob 29, by which the slide 25 is conveniently operated from the outside of the case, the stem 30 of the knob passing through a slot 31 in the case.

Assuming, then, that the tape has been adjusted, as above described, and that at some subsequent period of time the gauger comes to the tank to gauge the contents thereof, he will operate the crank 7 so as to unreel the tape from the drum 11 and, after the tape has been thus unreeled, to again reel up the tape on the outer drum. Thus the crank 7 will be turned continuously so as to lower the tape 12 until the weight 15 reaches the level predetermined for it and to then wind-up the unwetted portion of the tape.

The gauger looks through the opening 18 at the tape as it is being wound, and reads off the depth of the liquid as indicated on the tape by the height of the wet portion thereof. After he has made the reading, he will fully wind the tape and move the slide 25 into position to lock the shaft against rotation.

As the wet portion of the tape passes between the rollers 16, said rollers aid in wiping the liquid from the tape.

One use to which this gauge is well adapted is the gauging of the depth of oil in oil storage tanks.

I claim:

1. A fluid level gauging device, including a support, a winding means operatively mounted therein, a weighted gauging tape wound on the winding means, and means associated with the winding means operable for adjusting the winding means, to allow a predetermined length of tape to be unwound and then re-wound by a continuous operation of the winding means in one direction.

2. A tank gauge comprising two drums, one inside of the other, means for securing the drums for rotation in unison, the outer drum being provided with a slot, a tape secured to the inner drum and passing through the slot, and adapted to be wound on the outer drum, said securing means enabling relative circumferential adjustment of said drums, and means to rotate the drums for unwinding and then rewinding the tape upon the outer of said drums.

3. A tank gauge comprising two drums, a shaft, both of said drums being mounted on said shaft, one inside of the other, the outer drum being provided with a slot, a tape secured to the inner drum and passing through the slot to be wound on the outer drum, and means for securing the drums on said shaft in different circumferentially adjusted positions with respect to each other to regulate the length of tape that can be run off from the outer drum.

4. A tank gauge comprising two drums, a shaft, both of said drums being mounted on said shaft, one inside of the other, the outer drum being provided with a slot, a tape secured to the inner drum and passing through the slot, and securing means corresponding to the outer drum enabling the same to be loosened to allow it to rotate independently of the other drum and secured in an adjusted position, to regulate the length of tape that can be run off from the outer drum.

VICTOR WANEE.